March 4, 1958 D. S. RIDLER ET AL 2,825,890

ELECTRICAL INFORMATION STORAGE EQUIPMENT

Filed Aug. 3, 1953

Inventor
D. S. RIDLER - R. GRIMMOND
By [signature]
Attorney

United States Patent Office 2,825,890

Patented Mar. 4, 1958

2,825,890

ELECTRICAL INFORMATION STORAGE EQUIPMENT

Desmond Sydney Ridler and Robert Grimmond, London, England, assignors to International Standard Electric Corporation, New York, N. Y.

Application August 3, 1953, Serial No. 371,878

Claims priority, application Great Britain August 13, 1952

4 Claims. (Cl. 340—174)

This invention relates to electric circuits for the storage and/or transmission of information.

In U. S. Patent No. 2,649,502 an electric circuit has been described for the storage of information which comprises, according to claim 1 thereof, a chain of interconnected static electrical switches, there being a single switch in each stage of the said chain, and which also comprises means for storing information on the said chain as a pattern with any number, including one, of the said switches in the operated condition and any possible spacing of said operated switches.

In such a circuit, the effect of applying an electrical impulse to all of the said switches causes the pattern to move bodily along the chain of switches.

It has since been found possible to produce similar effects to those described above with devices using magnetic principles, and a pattern movement chain for storage and progression of an information pattern using magnetic trigger devices has been described in the "Proceedings of the Institute of Radio Engineers," volume No. 39, No. 4, for April 1951, by An Wang of Harvard University. The arrangement therein described, however, employs two magnetic trigger devices at each stage of the chain, whereas, according to the present invention, there is provided an electric circuit for the storage of information which comprises a chain of single magnetic trigger devices, there being a single device in each stage of said chain, and means for storing information on said chain as a pattern with any number, including one, of said devices in the triggered condition and any possible spacing of said triggered devices.

Figure 1:
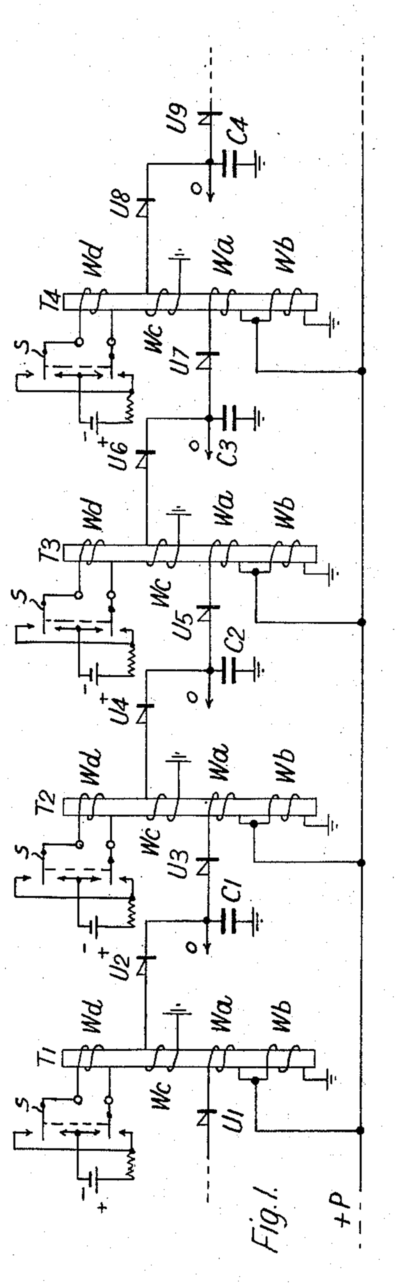
Figure 2:
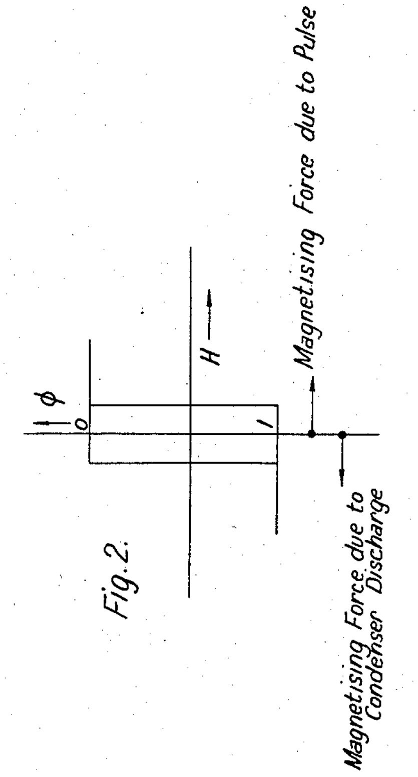

The invention will now be described with reference to the accompanying drawing illustrating in Fig. 1 a magnetic storage and distribution circuit which makes use of magnetic materials having high incremental permeabilities and a substantially rectangular hysteresis loop, as illustrated in Fig. 2, and such a magnetic distributor should possess the following properties considered to be desirable for general applications:

(*a*) The number of distribution points to be variable according to requirements by adding or taking away magnetic elements. Fig. 1 shows four such elements (T1–T4).

(*b*) More than one element to be capable of "conducting" at any one time to give a storage pattern, and pattern movement effect.

(*c*) A convenient output should be available from each element during the stepping pulse, i. e. in response to a pulse applied to the distributor for stepping it on, or changing its pattern.

(*d*) It should respond to pulse trains having a frequency of up to at least 10 Kc/s with materials now available, and with certain newer types of magnetic material to be referred to, much higher speeds should be achieved.

(*e*) It should be cheap, simple and robust.

The magnetic devices referred to are in the nature of saturable reactors with the added property that after being triggered by a pulse from one state to another (represented in Fig. 2 by the change from the bottom of the loop to the top), they will remain indefinitely in this second state until triggered back by an opposite pulse.

They are thus similar in their action to other relay devices such as gas discharge tubes and may be applied similarly in storage and counting circuits. They have this difference from gas tubes and the like, however: they have no inherently "conducting" or "non-conducting" state, the two magnetic states illustrated in Fig. 2 being purely relative states of positive or negative magnetisation of equal value (or use) and otherwise indistinguishable, so that the reference in (*b*) above to "conducting" is a borrowed or acquired property derived from the effect produced in the circuit by a change from one state to the other.

The feature mentioned above of remaining indefinitely in one or the other state dependent solely upon the application of a suitable triggering pulse is a valuable feature not possessed by other types of elements, e. g. gas tubes, which depend for their maintenance in an operated condition on the maintenance of the electric power supply.

With this introduction, it is possible to consider more particularly the circuit arrangement shown in Fig. 1. This figure shows a circuit representing four stages of a magnetic distributor or storage unit. T1–T4 are saturable reactors, preferably constructed as toroids from magnetic material exhibiting the rectangular hysteresis loop effect illustrated by Fig. 2. Each toroid comprises four separate windings W*a*–W*d*, used independently for changing the state of magnetisation of the core, W*a* and W*c* of these windings being interconnected between consecutive pairs of toroids by means of rectifiers U2; U3; U4, U5; etc. A voltage induced in the winding W*c* of one core will transfer a current in a manner to be described to the winding W*a* of the next succeeding core. Condensers C1–C4 are temporary storage, or "memory" condensers. W*b* is a pulsing winding, all such windings being connected in parallel to a pulsing wire +P. The arrangement is such that a pulse on wire +P will send a current through all the W*b* windings to cause all the cores to assume their untriggered condition. The W*d* windings are shown provided with individual batteries and forward-reverse switches S for enabling each individual toroid to be set up to a predetermined state of magnetisation. By throwing a switch one way, the associated core will become triggered; by throwing it the other way, the core will assume the untriggered condition.

Assume that reactor T1 has been previously set up to condition "1" of Fig. 2 by passing current through its W*d* winding in the appropriate sense, and that reactors T2–T4 have been set up to condition "0" of Fig. 2 by passing current through their W*d* windings in the opposite sense.

If now a step pulse is applied to the pulsing wire +P of a polarity such as to cause magnetisation in the "0" direction, no flux changes occur in T2–T4 as these are already in the "0" condition, but T1, which is in the "1" condition will be triggered to the "0" condition, and will pass through a region of high permeability to attain this condition. In these circumstances, it acts as a pulse transformer, and an E. M. F. is induced in its pulse output winding W*c*, whereas the other units are quite unaffected at this stage.

The induced E. M. F. on winding W*c* of T1 causes C1 to charge via U2 before saturation is reached in the "0" sense, and there will be no conduction through U3 while the pulse is applied as this rectifier is blocked by the pulse via the control winding W*a* of T2. When the pulse on +P ceases, the charge on C1 passes through U3 to energise control winding W*a* of T2 in such a direction as to change it from the "0" to the "1" condition, while the accompanying E. M. F. induced in W*c* of T2 is of negative polarity also and is blocked by the rectifier U4, so it cannot charge C2.

T3 and T4 are unaffected as a result of the application of the single step pulse, the only effect of which has been to pass the "1" condition in T1 on to T2, replacing it by the "0" condition in T1. The "pattern" has been moved one step to the right.

If the initial "pattern" had consisted of more than one toroid in the "1" condition, then the step pulse would have acted independently on each of such cores, changing each to the "0" condition, and passing the "1" condition forward to the next core when the pulse was removed.

The initial pattern may be set up in parallel, as described, via the W*d* windings, or serially, via the W*a* winding of the first core T1, inserting the pattern one element at a time and stepping it on automatically.

An "information output" during the pulse may be obtained from the memory condensers C1–C4 by connecting a suitable indicating device to the junctures "0" of the condensers and the rectifiers.

The invention has been described in relation to a single embodiment and based on the use of magnetic trigger devices in the form of toroids. While the devices may assume any convenient magnetic shape, the toroid is at present the only really practicable form on account of the materials used. These materials have incremental permeabilities of the order of 200,000 so that air gaps in the magnetic circuit have great significance. The toroid offers the most practicable solution when the core is wound from magnetic tape, owing to the large surface area in contact between the turns.

Another possible form of construction is that in which strips of the high permeability material are tightly clamped between jaws of soft iron or the like of large cross-sectional area, but the success or failure of this form of construction depends on the possibility of securing a really low reluctance joint.

While the principles of the invention have been described above in connection with specific embodiments, and particular modifications thereof, it is to be clearly understood that this description is made only by way of example and not as a limitation on the scope of the invention.

What we claim is:

1. An electric circuit for the storage of information comprising a plurality of magnetic trigger devices arranged in a chain, there being a single device in each stage of the chain, each of said trigger devices having a stable triggered condition and a stable untriggered condition, means for storing information on said chain as a pattern with any number including one, of said devices in the triggered condition and any possible spacing of said triggered devices, means for applying a train of step pulses to said trigger devices in parallel for causing any device in the triggered condition to assume the untriggered condition, means at each trigger device for producing an output pulse when said trigger device changes from the triggered condition to the untriggered condition, means including gating means responsive to the step pulse for delivering said output pulse to the next successive trigger device at the end of said step pulse, and means operated by said output pulse to cause said next successive trigger device to assume the triggered condition, whereby said pattern is caused to progress along said chain.

2. An electric circuit, as claimed in claim 1, further comprising means for applying information to the individual trigger devices of said chain.

3. An electric circuit, as defined in claim 1, in which the means for delivering the output pulse from one trigger device to the next successive trigger device comprises a condenser, means for causing said output pulse from said one trigger device to charge said condenser, a unidirectional current-carrying device connected between said condenser and the next succeeding trigger device, and means for causing a step pulse applied to said next succeeding trigger device to block said unidirectional current-carrying device to prevent the delivery of the charge on said condenser to said next succeeding trigger device until the termination of said step pulse.

4. An electric circuit, as defined in claim 3, further comprising means for applying information pulses to the individual trigger devices of the chain.

References Cited in the file of this patent

UNITED STATES PATENTS 2,652,501 Wilson ---------------- Sept. 15, 1953

OTHER REFERENCES

Publication: Electronics, January 1951, pp. 108–111.

IRE National Convention Record, part 7, March 23–26, 1953, pp. 38–42. Magnetic Shift Register Using One Core per Bit," by Kodis, Ruhman and Woo.